Oct. 16, 1962 H. A. SCOTT ETAL 3,058,764
RAIL BOND CONNECTOR DEVICES
Filed July 23, 1959

INVENTORS.
HARRY A. SCOTT
GEORGE E. DUGAN

BY
BLAIR, SPENCER & BUCKLES
ATTORNEYS.

United States Patent Office 3,058,764
Patented Oct. 16, 1962

3,058,764
RAIL BOND CONNECTOR DEVICES
Harry A. Scott, Darien, Conn., and George E. Dugan, New York, N.Y., assignors to Railroad Accessories Corporation, New York, N.Y.
Filed July 23, 1959, Ser. No. 828,967
4 Claims. (Cl. 287—20.3)

This invention relates to bonds or connectors for joining wire, e.g., stranded wire, to solid metal objects, and more particularly to rail bond or connector devices for joining stranded wire cable to railroad rails to form a reliable electrical connection therebetween.

Cable-to-rail connectors are required on railroads because contiguous rails must be joined electrically to complete signal and switching circuits in yards and along lines. Short lengths of stranded wire cable are preferably used for making such connections, and connector devices for joining these lengths of wire cable to rail sections should be easy to install and reliable in operation under adverse weather conditions.

Welded connections and various clamping and force fit connecting devices have been used in holes bored in the rail sections; these include tapered sleeves, split sleeves, roughened sleeves, threaded sleeves, tapered grooved pins and relatively soft socket plugs. Many of these connectors require special tools or machines for installation, greatly increasing installation costs. Still they often result in an unsatisfactory physical rail connection, and breakdowns are caused by rail vibration, the adverse effects of inclement weather, etc. Furthermore, such connector devices may perform inadequately because of small areas of physical contact, resulting in undesirable high electrical resistance. In addition, corrosion may weaken or destroy such connections, particularly when exposed to refrigerant and brine from refrigerator cars, or other deleterious substances.

These disadvantages have made necessary frequent inspection, repair and replacement of such connectors; also the initial expense of manufacture and installation has been a problem.

Accordingly, it is a principal object of the present invention to provide connector devices for joining stranded cable to metal objects such as railroad rails to provide a sturdy physical bond therebetween.

Another object of this invention is to provide connector devices of the above character affording a permanent low-resistance electrical connection between stranded cable and metal objects such as railroad rails.

A further object of the invention is to provide connector devices of the above character adapted for quick and convenient field installation with standard hand tools.

Another object of the invention is to provide connector devices of the above character affording highly efficient, corrosive-resistant connections between rails and stranded wire cables in railway switching and signal circuits.

A further object of the present invention is to provide connector devices of the above character making possible permanent electrical connections with a long useful life, requiring a minimum of upkeep and repair.

Still another object of the invention is to provide connector devices of the above character adapted for convenient and economical mass production manufacture.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figure 1:
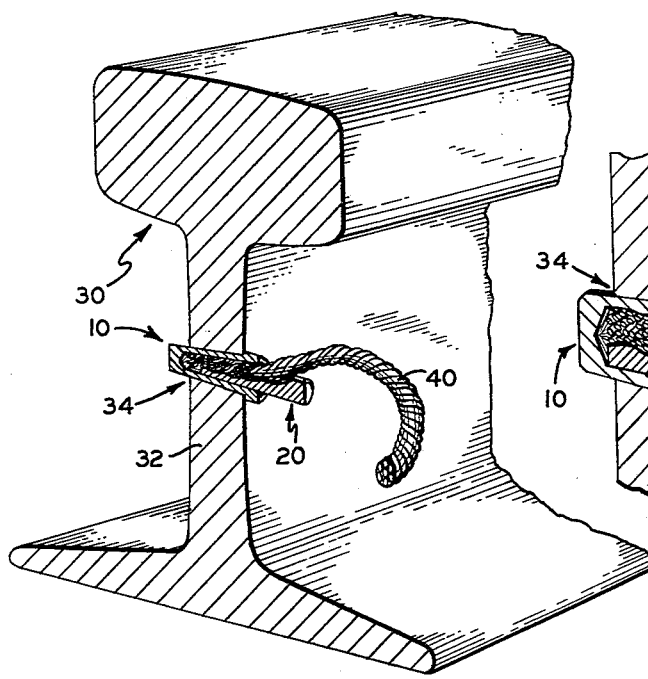
FIGURE 1 is a sectional perspective view of a segment of railroad rail showing one embodiment of the present invention installed in the web thereof.
Figure 2:
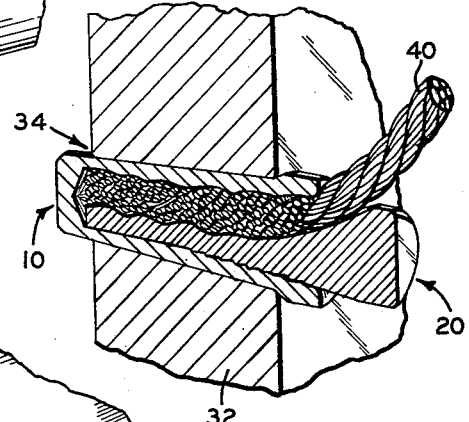
FIGURE 2 is an enlarged fragmentary sectional perspective view of the rail web and installed connector device of the present invention.

Referring to FIGURES 1 and 2, a preferred embodiment of the present invention is there shown installed in the web 32 of a railroad rail generally indicated at 30. The connector devices of the present invention include a socket element generally indicated at 10 inserted in an aperture 34 passing transversely through the web of the rail, and a grooved pin element generally indicated at 20 fitting within the socket element.

Socket element 10 has both an external taper and an internal taper, and the pin element 20 is tapered to correspond with this internal taper to provide a telescoping fit therein. These tapers are designed for interfering or driving force fits, so that the socket element must be driven into aperture 34 and the pin element must be driven into the socket member. Pin element 20 also has a longitudinal groove or slot 28 extending over part of its length, to accommodate the stranded cable 40, as shown in FIGURES 1 and 2.

This telescoping connector device is easily installed in the web of a rail having the transverse aperture 34 formed therein before delivery to the field, although apertures 34 may be formed at the installation site if desired.

The length of stranded wire cable 40 is first placed in position extending inside socket element 10, and the pin element 20 is partially inserted in the socket with its longitudinal groove 28 adjacent cable 40. The connector device thus assembled is then driven solidly into aperture 34 with direct blows on the exposed end of pin element 20. The external taper of socket element 10 is thus swaged against the wall of aperture 34 with considerable force, resulting in a mashing, extremely tight interfit therebetween. Pin element 20 is simultaneously driven home to force the cable into the bore of the socket element with great force. The taper of pin element 20, co-acting with the internal and external tapers of socket element 10, effects a telescoping wedging action and a solidly cold-swaged connection between rail and socket element, and an even more intimate merged connection between the cable and the connector elements. This results in a mechanically solid structure and an excellent electrical connection because of the large and practically complete surface areas of contact between all of the swaged elements. In fact, the exterior of the cable is forced bodily into the surfaces of the connector elements, as shown in FIGURE 2. The telescoping connector elements may be made of steel or any other electrically conducting material suitable for the swaging deformation described above. In some circumstances bronze or similar malleable metals may be used for socket element 10 to further this swaging action.

Figure 3:
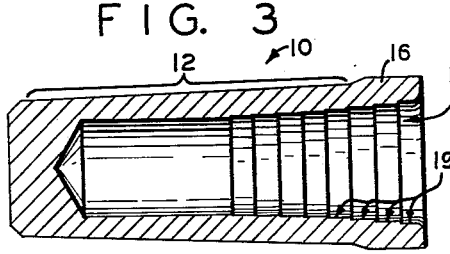
FIGURE 3 is a sectional side view of the socket element shown in FIGURES 1 and 2.
Figure 5:
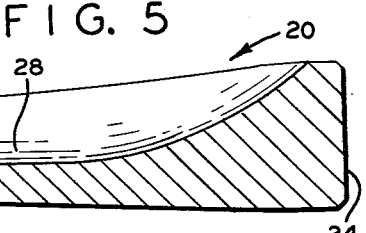
FIGURE 5 is a sectional side view of the pin element shown in FIGURES 1 and 2.
Figure 4:
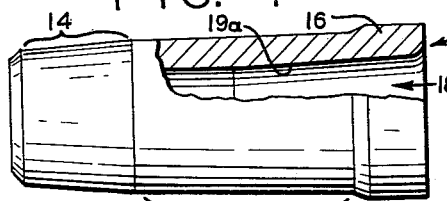
FIGURE 4 is a side view of the socket element of FIGURE 3.
Figure 6:
FIGURE 6 is a top view of the pin element of FIGURE 5.
Figure 7:
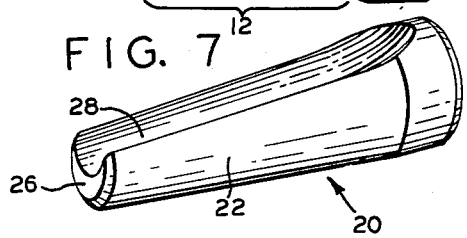
FIGURE 7 is a perspective view of the pin element of FIGURE 5.

Referring particularly to the enlarged views of FIGURES 3 and 4, it will be seen that the preferred socket element 10 is generally cylindrical or frusto-conical in shape, and formed with a long gradually diminishing external taper 12 over the greater part of its length, this taper being in the neighborhood of 4%, for example. Socket element 10 may also have a short external chamfer or taper 14 of greater slope at its smaller end for convenient entry into aperture 34, if desired, as shown in FIGURE 4. The larger end of socket element 10 is provided with an enlarged peripheral shoulder 16, and the diameter of taper 12 adjacent shoulder 16 is preferably slightly larger than the diameter of aperture 34, the amount of interference being, for example, on the order of 6 to 10% for a steel socket element. While the smaller end of socket element 10 is dimensioned to fit within aperture 34, this taper increasing to an interfering fit prevents the full entry of socket 10 into the aperture 34 until it is driven home as part of the swaged connector assembly, as described above.

In addition to external taper 12, socket element 10 is also provided with a central internal socket aperture or bore 18 extending from its enlarged shoulder end through the major portion of its length. Socket aperture 18 also has a gradually diminishing internal taper designed for telescoping wedging action with grooved pin element 20, as described above, and socket aperture 18 is larger than the diameter of cable 40. As shown in FIGURE 3, this diminishing taper of socket aperture 18 may be achieved by a progressive series of steps 19, each being in the neighborhood of 2% smaller than the last in internal diameter, with the diminishing steps 19 extending over a substantial part of the length of bore 18. In the preferred form of socket element 10a shown in FIGURE 4, a smooth internal taper 19a extends through a substantial part of the length of socket aperture 18. The socket aperture thus has a diminishing diameter throughout taper 19a, with a 6% to 10% reduction in diameter per unit of length.

Pin element 20 is also substantially cylindrical or frusto-conical in shape, with its external surface 22 being formed with a gradually diminishing taper from the vicinity of its larger driving head 24 to its smaller wedging end 26. The taper of surface 22 preferably conforms to the internal taper of aperture 18 in socket element 10, thus permitting the telescoping wedging action described above. The diameter and taper of pin 20 are selected so that its wedging end 26 will fit partway within the socket aperture 18, but will interfere therewith until driven home as described above.

As previously noted, driving pin 20 is provided with a recessed groove 28 extending from its wedging end 26 over a substantial part of its length, but terminating short of its larger full, ungrooved driving head 24. As seen in FIGURE 2, groove 28 does not accommodate the circumference of cable 40, but leaves a substantial portion thereof exposed to the surface of aperture 18 as pin element 10 is driven home. Accordingly, there is ample room for deformation of the cable and the two connector elements 10 and 20 during installation to form the driving swaged interconnection illustrated in FIGURE 2.

The driving installation of pin 20 as it telescopes within aperture 18 of socket element 10 causes cold working or swaging of the two connector elements and the cable 40, and the steps 19 contribute to this swaging action by concentrating the driving stress and deformation at their edges. The same driving installation also drives socket element 10 into a close swaging interfit with the surface of aperture 34, and hence with rail 30, to form a substantially integral and mechanically solid unit. The large areas of contact between all adjacent elements likewise produce an excellent electrical connection. The solid, substantially integral nature of the resulting structure provides no interstices in which corrosion or electrolysis can occur, and the connections of the present invention thus offer the advantages of economical manufacture and installation coupled with a greatly extended useful life.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An economical connector device for joining an electrical conductor of any desired length to a metal object having an aperture therethrough to form a corrosive-resistant connection of low electrical resistance between said conductor and said object comprising, in combination, an externally tapered socket element adapted for driving insertion into and partially through said aperture, and having a frusto-conical cavity therein closed at its narrow end, said end extending beyond said aperture after insertion, and an external wall which tapers in the same direction as the taper of said frusto-conical cavity, and a tapered pin with a longitudinal groove co-extensive with its tapered end portion, said pin being adapted for driving insertion into the cavity of said socket element after one end of said conductor has been placed into said groove, whereby said socket element will be expanded, and said walls of said aperture, said socket element, said end of said conductor and said tapered pin will be swagedly wedged together to form a substantially integral connection therebetween of long useful life requiring minimum upkeep and repair.

2. The connector device of claim 1 wherein the cylindrical socket element has an annular shoulder on its outside surface at its large end.

3. The connector device of claim 1 wherein the wall of the frusto-conical cavity in the cylindrical socket element has a series of steps which decrease in internal diameter in accord with the decreasing diameter of the frusto-conical cavity.

4. An economical corrosion-resistant electrical rail connection of low resistance comprising, in combination, a railway rail having an aperture pierced through its web portion, an elecrical cable conductor of any desired length as determined by the needs of the situation at the site of said connection, an externally tapered socket element adapted for driving insertion into and partially through said aperture, and having a frusto-conical cavity therein closed at its narrow end, said end extending beyond said aperture, and an external wall which tapers in the same direction as the taper of said frusto-conical cavity, and a tapered pin with a longitudinal groove co-extensive with its tapered end portion, said pin being adapted for driving insertion into the cavity of said socket element after one end of said conductor has been placed into said groove, whereby said socket element will be expanded and said walls of said aperture, said socket element, said end of said conductor and said tapered pin will be swagedly wedged together to form a substantially integral connection therebetween of long useful life requiring minimum upkeep and repair.

References Cited in the file of this patent

UNITED STATES PATENTS

| | | |
|---|---|---|
| 533,221 | Jacobs | Jan. 29, 1895 |
| 601,707 | Dainton | Apr. 5, 1898 |
| 686,941 | Jones | Nov. 19, 1901 |
| 1,578,901 | McCaulley | Mar. 30, 1926 |
| 1,697,826 | Burke | Jan. 1, 1929 |
| 2,009,318 | Highfield | July 23, 1935 |
| 2,434,152 | Forry | Jan. 6, 1948 |
| 2,582,937 | Bovard | Jan 15, 1952 |

FOREIGN PATENTS

| | | |
|---|---|---|
| 954,783 | France | June 13, 1949 |
| 26,506 | Great Britain | Dec. 19, 1905 |